United States Patent [19]

Shore et al.

[11] 4,164,276

[45] Aug. 14, 1979

[54] CLUTCH-BRAKE STEERING MECHANISM FOR TRACTORS

[75] Inventors: Daniel B. Shore, Niles; Probir K. Chatterjea, Mount Prospect, both of Ill.

[73] Assignee: International Harvester Company, Chicago, Ill.

[21] Appl. No.: 708,956

[22] Filed: Jul. 26, 1976

Related U.S. Application Data

[62] Division of Ser. No. 561,119, Mar. 24, 1975, Pat. No. 4,015,619.

[51] Int. Cl.² .................................. F16D 67/04
[52] U.S. Cl. ............................ 192/13 R; 192/12 C
[58] Field of Search .................. 192/4 A, 12 C, 13 R

[56] References Cited

U.S. PATENT DOCUMENTS

| 2,722,986 | 11/1955 | Baldine | 192/13 R |
| 3,907,052 | 9/1975 | Shaw | 192/13 R X |

Primary Examiner—Allan D. Herrmann
Attorney, Agent, or Firm—John W. Gaines; Ronald C. Kamp; F. David AuBuchon

[57] ABSTRACT

Clutch-brake steering unit having hydraulically actuated cylinders for controlling same to control rotation of a track-drive sprocket in a crawler tractor. Specifically a clutch cylinder and a brake cylinder provided in the unit have an inlet-outlet port in common, and are so arranged on a spring-applied-brake, hydraulically-applied-clutch basis that a single pressure signal in the inlet-outlet port alternately operates the cylinders to apply the brake and release the clutch, to apply the clutch and release the brake, or by proper modulation to partially engage either, i.e., slip the clutch or drag the brake to intermediate degrees as desired.

7 Claims, 8 Drawing Figures

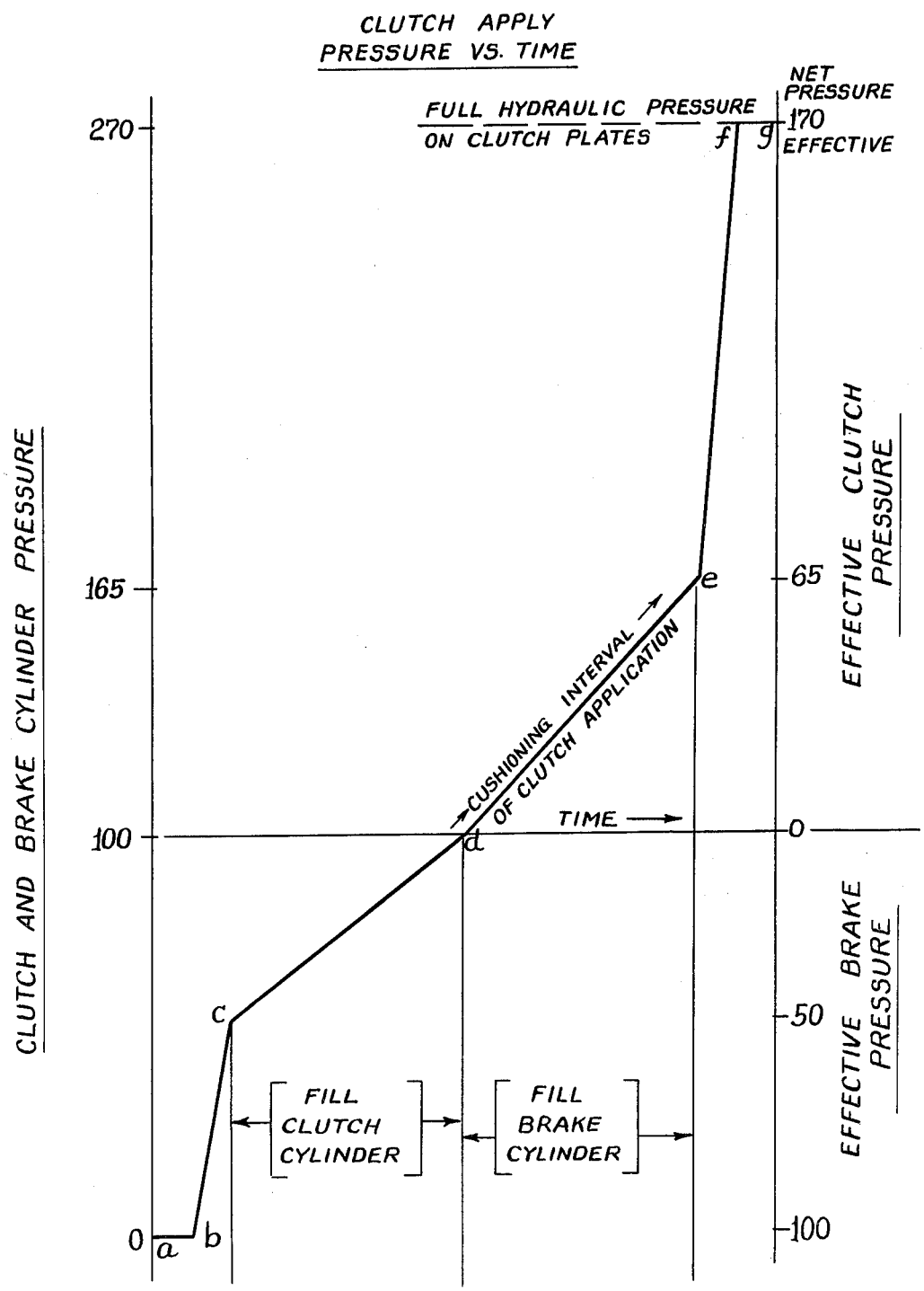

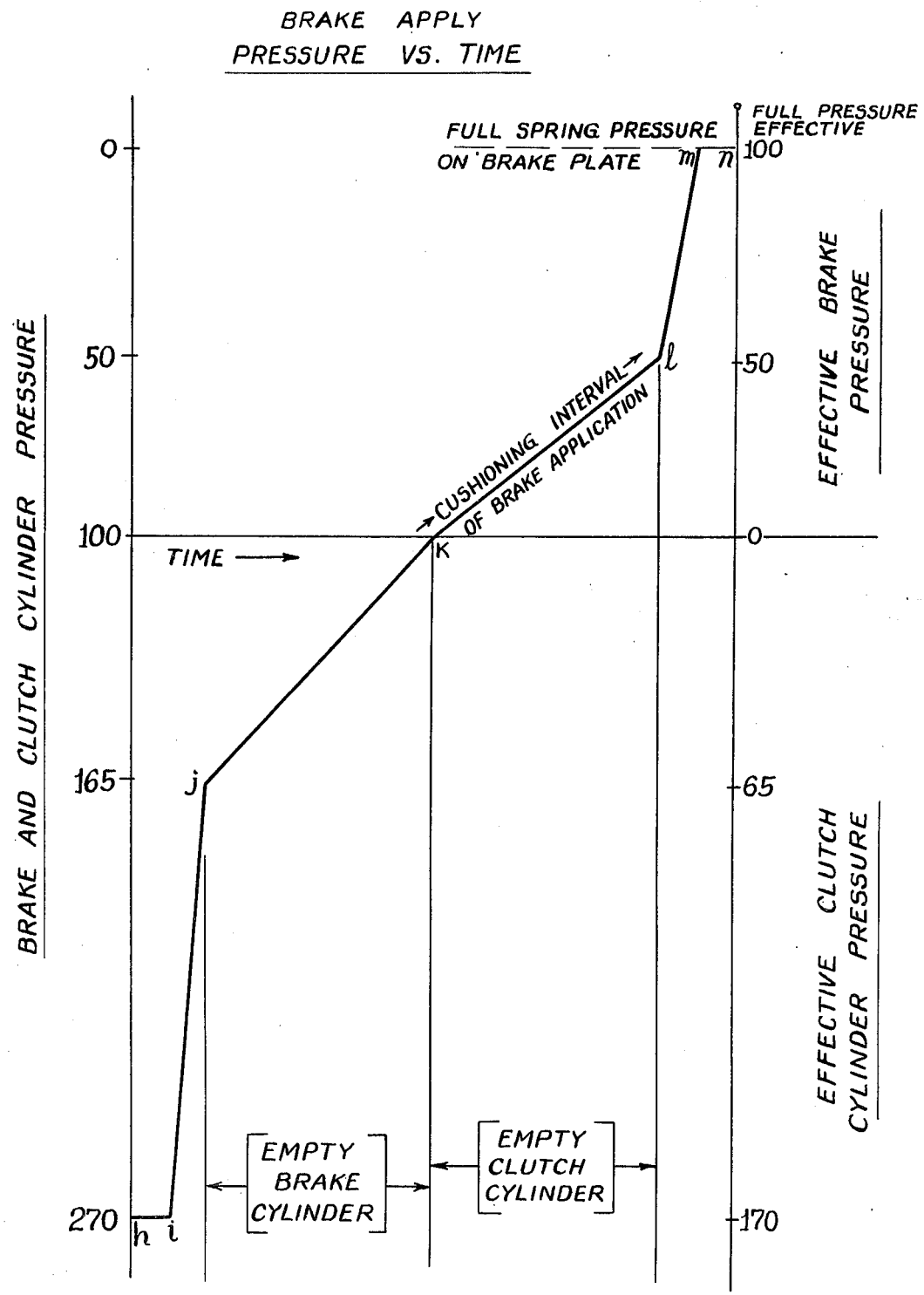

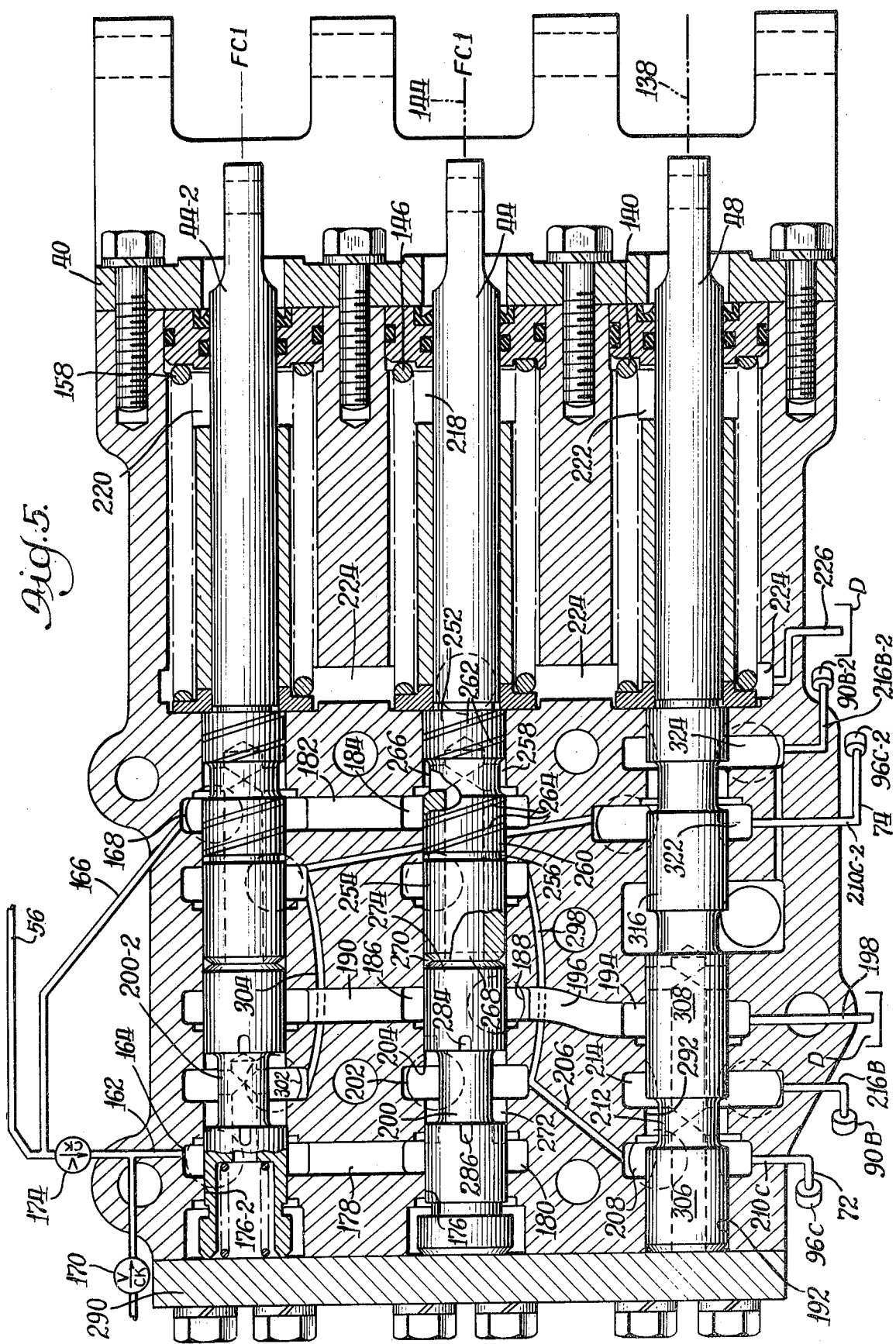

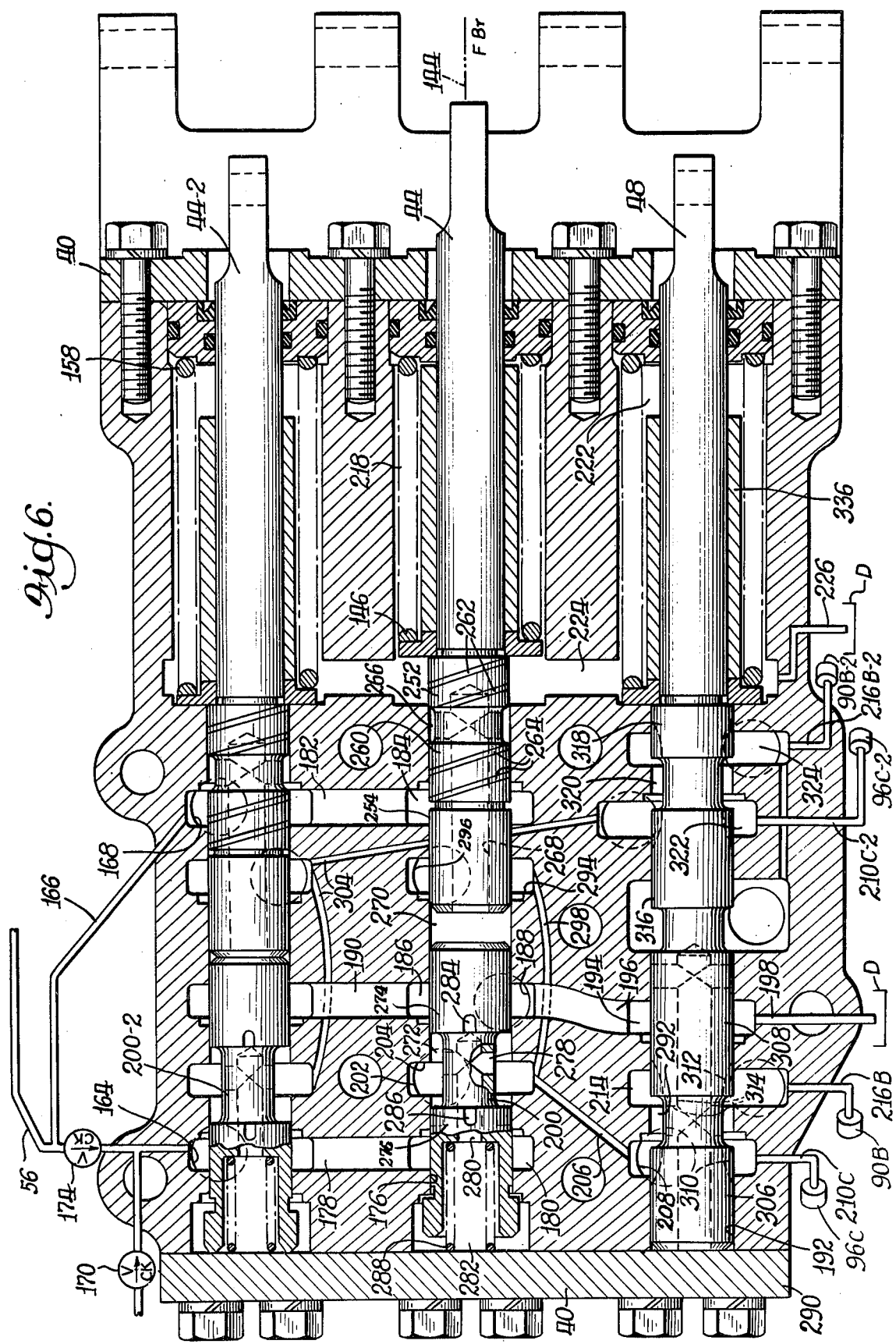

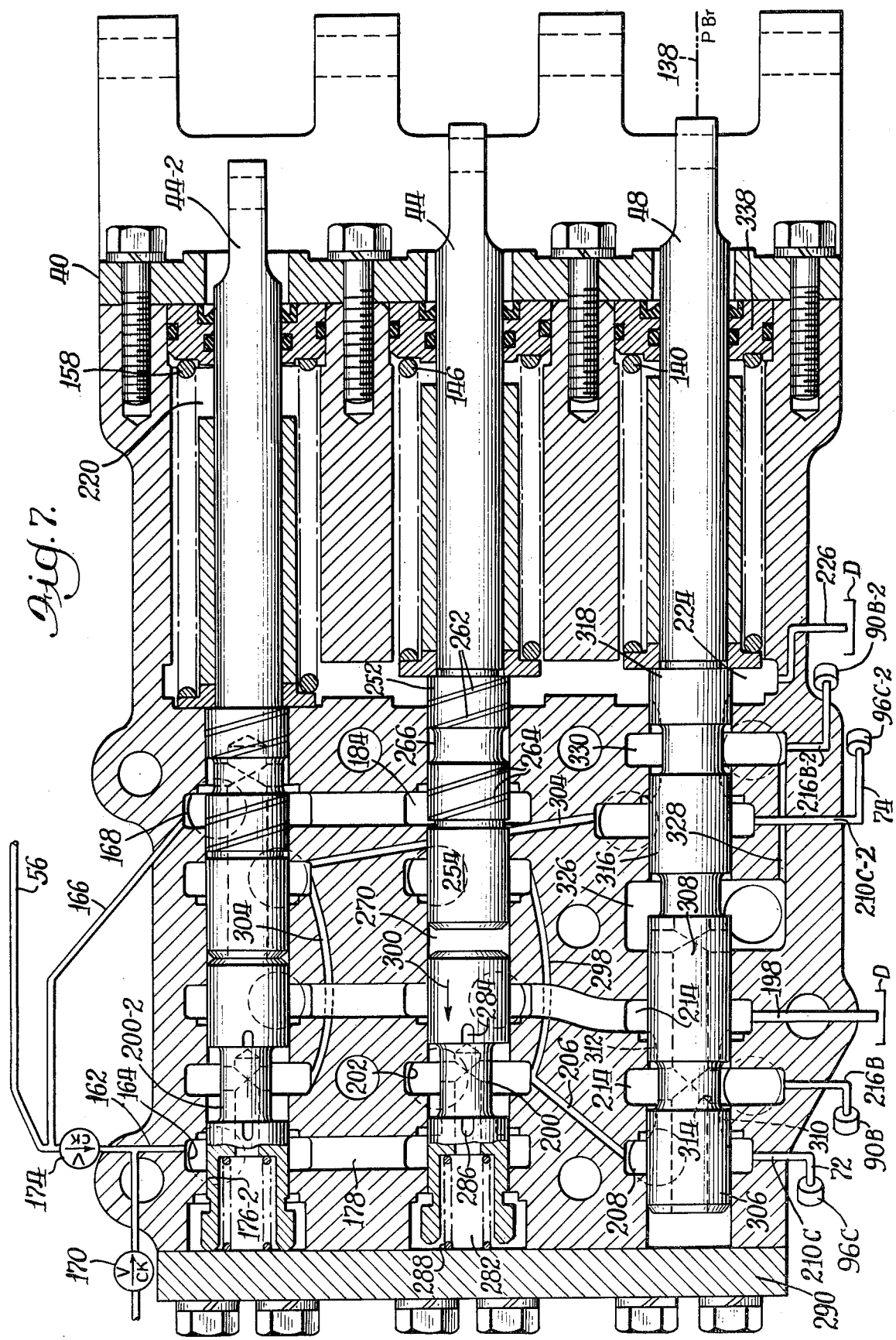

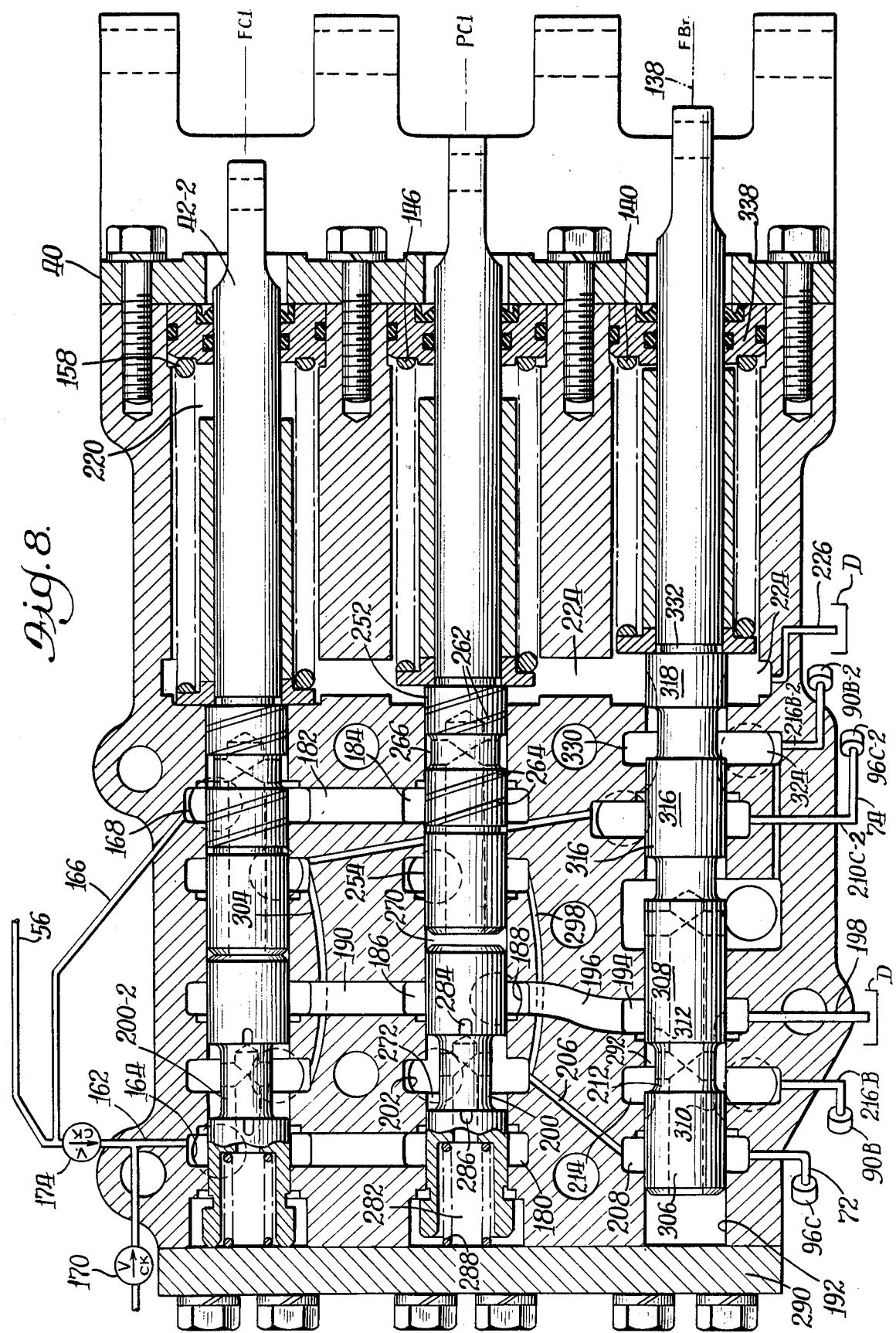

CLUTCH-BRAKE STEERING MECHANISM FOR TRACTORS

This is a division of application Ser. No. 561,119, filed Mar. 24, 1975 now U.S. Pat. No. 4,015,619 issued Apr. 5, 1977.

This application relates to clutch-brake mechanism for use in vehicles which are steered-by-driving. It more particularly relates to the left and right clutch-brake steering units for a crawler tractor.

It is an object in connection with steering mechanism according to our invention, to provide an alternately acting, hydraulically actuated clutch-brake unit so arranged that braking is automatic (spring applied) upon failure of hydraulic pressure, thus affording fail-safe braking.

An object in line with the preceding objective is to provide a clutch-brake unit in which a single signal is used for control pressure both for the clutch and for the brake in the unit.

A further object is to provide a metering valve for controlling the signal pressure, also provide an inlet-outlet port to which clutch and brake cylinders are connected in common and controlled by the metering valve as the signal pressure is applied or released, and additionally provide correlated sets of springs on the clutch and brake causing engagement of each cylinder to be cushioned by delayed pressure-change owing to the fact that the volume of the cylinder of the other is undergoing a metered change because of the metering valve's restrictive control over the common inlet-outlet port.

According to practice in the past in connection with some clutch-brake steered crawler tractors, the steering clutch has been operated through a controlled rate-of-rise valve to cushion clutch engagement. Similarly, the companion brake has been operated through a second valve and, if the manner desired has been to cushion the brake engagement, the second valve has likewise afforded controlled rate of pressure rise in the brake cylinder. It has therefore been the practice to have some accurate coordinating means providing for precise coordination of operation of the two clutch and brake valves, which only slightly overlap in operation so as to insure appreciable releasing of the clutch prior to starting to engage the brake, and vice versa. Disadvantages and inherent complications have arisen because of the need for special rate-of-rise valve control and coordination of the valve operations in controlling or slowing rate of pressure rise in the cylinders.

Our invention materially reduces, if not substantially eliminating, the foregoing disadvantages and complications, as will now be explained in detail. Various features, objects, and advantages will either be specifically pointed or become apparent when, for a better understanding of our invention, reference is made to the following description taken in conjunction with the accompanying drawings which show a preferred embodiment thereof and in which:

FIGS. 3 and 4 are graphs showing the desired pressure-time traces involved in achieving respective cushioned clutch application and cushioned brake application; and FIGS. 5, 6, 7, and 8 are partly schematic, cross-sectional views of a steering valve, showing it in various positions in its operation in the hydraulic control circuit of clutch-brake mechanism.

Figure 1:
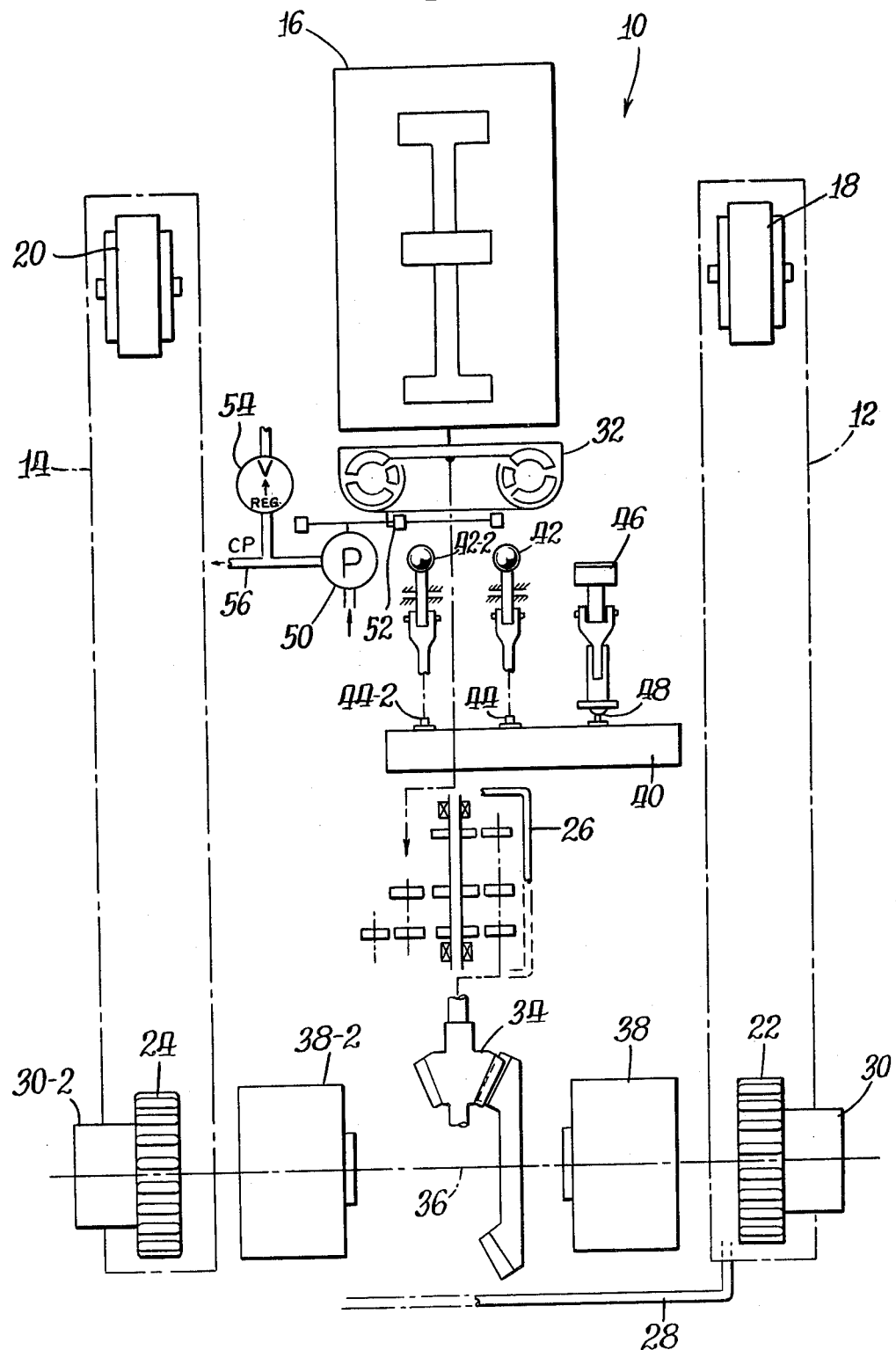
FIG. 1 is a schematic view, in top plan, of a crawler tractor embodying our hydraulically actuated, clutch-brake invention.

More particularly, in FIG. 1 of the drawings, a crawler tractor 10 is shown having undercarriage structure including right and left endless track assemblies 12 and 14, having a front mounted engine 16, and having a chassis, not shown, supported on the undercarriage structure and supporting the engine 16. The undercarriage structure further includes at its respective sides right and left front idler wheels 18 and 20 and right and left track drive sprockets 22 and 24.

The power train from the engine 16 of the tractor includes a three-speed, reversible power shift transmission 26, a rear main frame 28 holding the steering mechanism, and suitable interconnections in the power train whereby the sprockets 22 and 24 receive their driving torque, as from a right final drive 30. More specifically, a torque converter 32 interconnects the engine 16 and the power shift transmission 26. Meshing bevel and crown gearing 34 interconnects the transmission 26 and the rear axle 36 of the tractor, and a right steering clutch-brake unit 38 controls power rotation or braking of the right final drive 30 which is supplied with torque by the rear axle 36.

For purpose of hydraulic control over the steering mechanism in the rear main frame 28, the tractor 10 has a steering valve assembly 40 and, for that purpose, the steering valve assembly has operator-operated hand levers including a right steering lever 42 connected to a right-steer spool valve 44 included in the valve assembly 40. A brake pedal 46 is connected to a brake spool 48 included in the valve assembly 40.

The steering valve connections are omitted from FIG. 1 for simplification, but receive the usual hydraulic fluid for their operation from a rotary pump 50 driven by a meshing pinion and gear 52 which are connected to the output side of the torque converter 32. A regulator valve 54 which is tied to the output side of the pump 50 has a constant setting so that pressure in the output line 56 will be essentially constant, e.g., 270 psi (18 atmospheres) under varying pump speeds.

The steering controls and drives in the tractor 10 are essentially symmetrical, thus further including, for the left side, a second steering lever 42-2, a second steering valve 44-2, a second clutch brake unit 38-2, and a second final drive 30-2.

In operation of the tractor 10, torque in the power train from the engine 16 is applied through the torque converter 32 to the power shift transmission 26 and gearing 34, which drive the rear axle 36 at a speed and in the direction selected. Line pressure from the line 56 is applied with appropriate modulation by the steering valve assembly 40 to the clutch-brake units 38 and 38-2 so that the operator can cause the sprockets 22 and 24 to rotate the endless track assemblies 12 and 14 at the same speed for straight line drive in either direction, or at different speeds for power turns or braked turns, either left or right forwardly, or left or right rearwardly.

STEERING MECHANISM—FIG. 2

In accordance with the arrowed path appearing in this figure, power flow from the transmission, not shown, follows along a propeller shaft in the path of an arrow 58 into the bevel and crown gearing 34 so as to be conducted laterally by the rear axle 36 in the opposite directions indicated by a double headed arrow 60. In the right direction, for example, lateral power flow from the axle and right steering clutch-brake unit 38 is in the direction of an arrow 62, through bull gearing 64 and the right final drive 30, thence into the right track drive sprocket 22. More particularly, except for a radial flange 66 integrally carried by the axle adjacent its right end, the axle 36 which is hollow is generally symmetrical when one end is compared to the other. The axle 36 is journalled for rotation in a clutch-brake housing 68 by means of a span of bearings including a tapered roller bearing 70 illustrated. Longitudinal passages in the axle 36 include separate, oppositely extending hydraulic passages 72 and 74 which are parallel to the hollow interior 76 thereof. The referred to radial flange 66 at its periphery carries a crown gear 78 meshing with the bevel pinion of the gearing 34 and driving the axle 36 through a desired reduction gear ratio.

For brevity's sake, only the right steering clutch-brake unit 38 is herein illustrated and described. The axle 36 has a counterbore 80 in the end which communicates with the hollow interior 76 and in which a short extension plug 82 is tightly press-fitted. Intersecting lubricating passages 84 which are normal to one another communicate with lubricant supplied into the hollow interior 76 so as to conduct lubricant through the plug 82 to the unit 38.

A right brake piston 86B which carries seals cooperates with a brake backing plate 88 to define a sealed right brake cylinder 90B. The brake backing plate 88 is fixed in the clutch-brake housing 68 and carries brake disk splines. The brake piston 86B is hydraulically retracted by means of the cylinder 90B and is spring applied by means of a set of brake springs 92 pressing thereagainst which seat at their opposite end against abutments in the housing 68. In one physically constructed embodiment of the spring 92, their spring rate was such that they just began to overcome opposing pressure and started to collapse the cylinder 90B when the pressure in the latter dropped to 165 psi (11 atmospheres). From their fully expanded position, the springs 92 started to collapse when the pressure in the brake cylinder 90B rose to 100 psi (7 atmospheres).

A right clutch piston 94C in the clutch-brake unit 38 cooperates with the lateral or outer face of the radial flange 66 of the axle 36 to define a right clutch cylinder 96C. The piston 94C is operated so as to be spring-released by a set of clutch springs 98, and is pressure applied by the clutch cylinder 96C. The piston 94C through its movement applies a pressure plate portion 100 thereof which has a larger diameter than the piston portion and which constitutes the radially outer periphery of the piston 94C itself. In one physically constructed embodiment of the invention, the spring rate of the clutch springs 98 was such that they initially started to expand when the pressure in the clutch cylinder 96C had decreased to 100 psi (7 atmospheres). From their expanded position of full travel, the set of clutch springs 98 started to compress when the clutch pressure in cylinder 96C rose to 50 psi (3 atmospheres).

A bolted on clutch backing plate 102 is affixed to the periphery of the axle flange 66 and is formed with a set of clutch disk splines. A clutch-brake output member 104 common to the clutch and brake carries a set of disk splines 106, and the splines 106 cooperate with the splined brake backing plate 88 and clutch backing plate 102 for friction engaging purposes by mutually carrying a set of brake disks 108B and a set of clutch disks 110C of standard construction. The common output member 104 is independently rotatably mounted by means of a bearing 112 on the axle extension plug 82 which, through the lubricant passages 84, provides lubricant for the bearing. A clutch brake output shaft 114 is bolted to the common output member 104 and transmits torque in the direction of the arrow 62 so as to drive the bull gearing 64 through a spline-carried, quill shaft interconnection 116.

The bull gearing 64 is connected through a shaft 118 to the sun gear 120 of a planetary gear set. The planetary gear set further includes a pinion carrier 122 and a ring gear 124 which is fixed owing to its interconnection to a fixed main case 126 by means of a toothed plate 128. A set of planet pinions 130 on their common carrier 122 meshes along an inner pitch circle with the sun gear 120 and meshes along an outer pitch circle with the ring gear 124, so as to impart through the carrier 122 a reduced gear speed to a rotationally supported casting 132 carrying the sprocket 22 and affixed to the carrier of the final drive 30.

STEERING OPERATORS—FIG. 2

Figure 2:
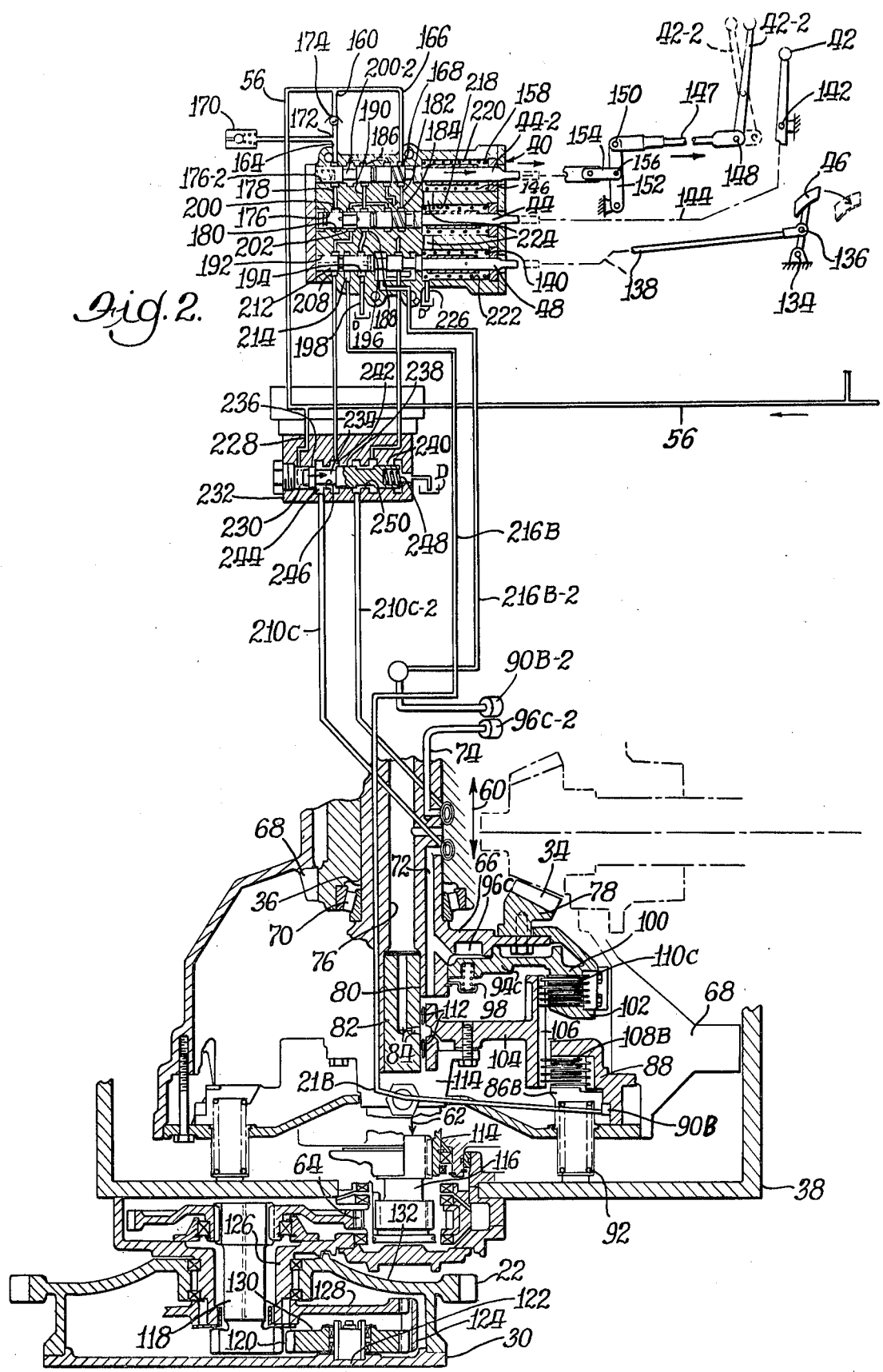
FIG. 2 is a partially schematic, cross sectional view of our clutch-brake mechanism and hydraulic control circuit therefor.

Hand and foot operation is utilized according to the illustrated example in FIG. 2, and the operators comprise the brake pedal 46 and the left and right steering levers 42-2 and 42. The brake pedal 46 has a bottom pivot 134 and through a clevis connection to a mid-pin 136 on the pedal, the pedal 46 operates a pull connection 138 to pull the foot brake spool valve 48 to a braking position as opposed by a spool valve return spring 140. The brake-applied position is shown in broken line in FIG. 2.

The steering levers have a mid pivot such as illustrated at 142 for the right steering lever 42 and, as shown in FIG. 2, the connection from the steering lever 42 is schematically illustrated at 144 which interconnects with the spool valve 44 to pull it into the braked position as opposed by a spool valve return spring 146. Or especially as can be seen in FIG. 2, the connection to the left steering lever 42-2 is more fully illustrated to include a pull link 147 having a front clevis connection to a bottom pin 148 on the lever 42-2, a rear clevis having a connection to a top pin 150 on a bottom-pivoted link 152, and a pull link 154 connected to a mid-pin 156 on the link 152 and connectd to the left spool valve 44-2 so as to pull the latter against the resistance of a spool valve return spring 158.

STEERING HYDRAULICS—FIG. 2

In the hydraulic circuit as shown according to this figure, the line 56 carrying line pressure splits up at 160 into a metering valve branch 162 connected to a pressure port 164 in the steering valve assembly 40 and into a second branch 166 connected to a signal pressure port 168. A one way towing valve 170 has a tee connection 172 with the metering valve branch 162 and opens in the direction of the tee. Intermediate the split up 160 and the tee 172, a one way valve 174 is connected in the branch 162 and opens in the direction of the tee 172. The pressure ports 164 and 168 are in the inlet side of the steering valve assembly 40 and are connected to a longitudinal first bore 176 in the assembly by, respectively, a valve passage 178 and a bore groove 180, and a valve passage 182 and a bore groove 184.

Another bore groove 186 is the means by which a drain port 188 communicates with the bore 176 and also communicates with an upwardly directed passage 190 in the valve assembly 40. A brake valve bore 192 which is parallel to the valve bore 176 includes a bore groove 194. The drain port 188 communicates through a downwardly extending passage 196 and the bore groove 194 with a drain line 198.

Disposed in mutual end-to-end abutting relationship the spool valve 44 and a metering spool 200 share the right-steer bore 176. Adjacent the metering spool 200, an inlet-outlet port 202 communicates therewith through a bore groove 204. The inlet-outlet port 202 also communicates with the clutch cylinder 96C in a path including a valve passage 206, a bore groove 208 in the brake bore 192, and a right clutch line 210C, thence through the right axle passage 72 into the right clutch cylinder 96C.

A spool 212 adjacent the end of the brake spool valve 48 communicates with the bore groove 208, and controls flow therefrom to the right brake cylinder 90B in a path including a bore groove 214, thence through a right brake line 216B into the brake cylinder 90B.

In addition to the valve bore 192 parallel thereto, the bore 176 has a second bore 176-2 formed parallel thereto in the steering valve assembly 40. The second bore includes the spool valve 44-2 and a metering spool 200-2 and communicates in similar way by means including a line 210C2 and 74, and also a line 216B-2, with a respective left clutch cylinder 96C2 and left brake cylinder 90B2.

In the steering valve assembly 40, spring chambers 218, 220 and 222 of large diameter receive the respective smaller diameter spool valves 44, 44-2, and 48, and communicate through a common, side groove 224 with a drain 226.

The present fail-safe braking system, under which the system automatically and fully sets the steering brakes upon loss of hydraulic pressure in the system, necessitates provision of a tow valve, now to be described.

TOW VALVE—FIG. 2

Through a branch 228, line pressure from the line 56 flows into the actuating pressure chamber 230 at one end of the valve bore in a two valve 232. A slidable valve spool 234 therein includes a pressure-movable end land 236, an intermediate land 238, and a land 240 at the hollow, right end of the spool 234. The two valve 232 is interposed in the right clutch line 210C so that the line passes through a pair of longitudinally spaced apart bore grooves 242 and 244 which are interconnected by a bore passage 246.

At the opposite end of the spool 234 from the chamber 230, a return spring 248 yieldingly cooperates with the actuating line pressure by collapsing to allow the spool to move from the broken line position into the position as shown by the solid lines 234 in FIG. 2. So under the action of line pressure, the valve 234 allows the grooves 242 and 244 to communicate through the bore passage 246, thus directing clutch pressure fluid in the clutch line 210C in the way desired. At the same time, another bore passage 250 allows similar communication in the second clutch line 210C2, in response to line pressure in the actuating chamber 230. Under these circumstances, the end land 236 blocks off line pressure so as to confine it to that chamber 230, and presents the pressure-moveable end area of the spool 234.

TOWING—FIG. 2

In a towing situation of the tractor, there is no line pressure and so, separately, external pressure must be introduced into the system. Pressure, of course, if present generally throughout the system would tend in an unwanted manner to apply the hydraulically applied clutch, and yet local pressure properly confined is necessary in order to release the spring applied steering brakes of the vehicle.

The status existing for emergency towing will be that the lines are under no pressure and that the return spring 248 of the two valve 232 is holding the valve spool 234 in the emergency, broken line position shown.

Emergency fluid introduced under pressure through the one-way valve 170, such as chassis grease pumped in by a hand lubricant gun, will be prevented by the one-way valve 174 from making escape and will be forced to flow through a path including the pressure port 164, passage 178, the right metering spool 200 in its open position as shown in solid lines in FIG. 2, the bore groove 204, and the right inlet-outlet port 202. The path of fluid flow further includes the valve passage 206 and the groove 208 of the bore 192 where the path splits up. That is to say, part of the path of fluid flow includes the bore groove 214, the brake line 216B, and the brake chamber 90B as desired. Also, the rest of the fluid flow path includes the bore groove 208, the tow valve bore groove 242, and the two valve land 238 which interveness and blocks the clutch line 210C so that the right clutch cylinder 96C receives no pressure and remains disengaged.

Accordingly the right brake becomes released and the clutch stays released to allow the vehicle to be towed.

Likewise, the second brake cylinder on the left side 90B-2 becomes released and the second clutch cylinder on the left side 96C2 stays released, but the paths and fluid operation are not detailed for brevity's sake.

ALTERNATIVE ACTION

The foregoing is the only exception to the general rule. The general rule is that the clutch and brake on the right side of the tractor act solely in alternation to one another and the clutch and brake on the left side act solely in alternation to one another. For example, under low or moderatly low pressure in both hydraulic circuits of the system, the clutches will remain disengaged whereas the brakes either will be fully engaged or will drag to the proper degree.

On the other hand under high or moderately high hydraulic pressure, the clutches will be fully engaged or will slip to the degree desired, while the brakes will stay released.

SINGLE CONTROL PRESSURE

From the foregoing, and with specific reference to the inlet-outlet port 202 of FIG. 2, it is evident that a single control pressure applied to an inlet-outlet port 202 will, depending upon its value, set the tractor in selective conditions for, respectively, full braking, brake dragging, no clutching or braking, clutch slipping, and full clutching without "fight" between a clutch on one hand and the brake on the other. This inherent coordination makes for a significant simplification of control.

LIGHT/HEAVY SPRINGS

Typical for both sides of the tractor, the spring force of the brake springs 92 for the right side is the range of about 100-165 PSI (7-11 atmospheres) at the extremes of travel allowed the springs. For the clutch springs, the spring force at 98, for example, is in the range of 50-100 PSI (3-7 atmospheres) at the extremes of clutch spring travel. These figures are ones equivalent to, and in terms of, the actual hydraulic system pressure, and it will be seen that one set of springs will have completed its travel just when the other set of springs begins its travel.

Thus if we increase the hydraulic pressure from 50 PSI (3 atmospheres) to 165 PSI (11 atmospheres), the clutch springs immediately begin contracting travel and complete their travel at 100 PSI (7 atmospheres) so as to bring the individual clutch disks into initial engagement, that is, just making contact but with no pressure of engagement thereupon. Immediately after the 100 PSI (7 atmospheres) is exceeded in this system, and contemporaneously with pressure of engagement starting to be applied to the touching clutch disks, the brake springs begin collapse so that the brake disks, e.g., disks 108D which are no longer under any residual spring contact pressure, are allowed to free themselves from contact and the disengagement continues to 165 PSI (11 atmospheres) when the brake springs reach their full extent of contracting travel.

The reverse order is also true because, with decreasing circuit pressure, the brake springs 92 expand for the principal portion of their travel as hydraulic pressure drops from 165 PSI (11 atmospheres) to 100 PSI (7 atmospheres). Then as the decreasing pressure continues dropping below 100 PSI (7 atmospheres), pressure of contact building up in the brake springs is exerted on the brake disks while the clutch disks 110C, which are under no contact pressure, are free from the pressure plate 100 as the clutch springs 98 expand to the full extent of their allowed travel. The clutch spring travel is completed at the point of a pressure drop to 50 PSI (3 atmospheres) in the hydraulic circuit.

Although we can doubtless attach significance to the separate and successive sequencing of the spring sets because of inherently insuring no clutch-brake "fight", there is some deeper significance attached to the sequencing from coodinated spring rates, because of inherent cushioning in hydraulically setting the brakes and engaging the clutches, now to be explained.

CUSHIONING OF CLUTCH—FIG. 3

A desired pressure-time relationship is graphed in this figure leading up to full clutch engagement, and an illustrative curve is shown composed of connected linear segments and denoted by a, b, c, d, e, f, and g. The curve segment ab represents zero pressure maintained in the hydraulic circuit by the metering valve, not shown. When the metering valve is hydraulically shifted into its clutch-fill position, pressure rise is practically instantaneous as illustrated by the curve segment bc whereas the segment cd denotes a slow rate of hydraulic pressure rise occurring throughout the entire spring travel range of the clutch springs, not shown. That is to say, spring travel of the clutch springs toward full spring compression means that the clutch cylinder, not shown, is filling with progressively increasing volume and therefore readily accommodating the metering valve flow so that the pressure rises only gradually. At the point d, the brake disks are in contact under no pressure and the clutch disks are similarly in contact under no contact pressure.

Novelty is felt to reside in the situation represented by the curve segment d e. In that situation simultaneously with contact pressure on the clutch disks being initiated and progressively increasing, the brake springs, not shown, are undergoing their entire range of travel and an important function is transpiring. The important function is that volume in the brake cylinder, not shown, is progressively enlarging and thus readily consuming the metered fluid flow from the metering valve, thus limiting the pressure rate of rise to the desired slow rate. Accordingly, clutch contact pressure rises linearly at slow controlled rate, rendering initial engagement of the clutch soft and free from abrupt shock. Cushioned engagement of the disks means appreciably reduced wear on their friction engageable surfaces.

The operation represented by the curve segment ef is final pressure application to the clutch disks which follows at a fast rate of rise in pressure for complete clutch engagement; practically no clutch slip is allowed during this operation. The completed engagement is represented by the curve segment fg, with the steering clutch involved being fully engaged for solid 1:1 drive at one side of the vehicle and the companion brake being fully disengaged so as not to interfere.

CUSHIONING OF BRAKE—FIG. 4

A pressure-time relationship is graphed in this figure illustrative of the events culminating in full spring-applied brake engagement, and the illustrative curve is composed of interconnected linear segments and is denoted h, j, k, l, m, and n. The curve segment hi represents the hydraulic system at one side of the vehicle being under full pressure as directed thereto by the metering valve on that side, not shown. Shift of the metering valve into a position allowing metered escape of the hydraulic fluid from the system is represented by the curve segment ij, illustrating a somewhat instantaneous or abrupt decrease of pressure in the system. Full travel of the brake springs, not shown, due to their selected spring rate, is represented by the curve segment jk. That is to say, the brake springs expand over their principal range of travel and effective volume of the brake cylinder progressively decreases. The effect of the emptying brake cylinder is that the rate of pressure drop is comparatively slowed down as the outflow from the cylinder makes it way through the metering valve, not shown. And upon reaching the point k on the curve, the condition as reflected at that point dictates that the brake is in the status of having a fully collapsed cylinder and the brake disks are in contact but under no pressure, whereas the clutch cylinder still has the status of being in a full condition but the clutch disks, not shown, are in contact under no contact pressure.

Novelty is felt to be present throughout that operation represented by the segment kl of the curve. Throughout that operation, decreasing cylinder pressure in the fully extended clutch cylinder, not shown, allows the clutch springs, not shown, to collapse the cylinder through their entire range of travel represented by the curve segment kl. But escaping fluid from the emptying clutch cylinder requires an interval to make its way through the metering valve, not shown, and so the rate of pressure decrease is reduced during initial application of the spring applied brake. Brake disk pressure is therefore slowly applied by the springs and a soft gradual brake engagement interval ensues.

Cushioned engagement of the disks means signficantly reduced wear on their friction engageable surfaces.

The curve segment lm represents full application of the brake under brake spring pressure following collapse of the clutch cylinder. The final pressure reduction represented by the segment 1m is at a rapid rate and brings on the brake application at full spring pressure. Thereafter, the full-brake application interval is represented by the segment mn on the pressure-time curve. The brake is therefore fully set at the vehicle side concerned, and the companion clutch is fully disengaged so as not to interfere.

MODULATION

Between the pressurization condition of full line pressure, which obtains in the system when maintaining full clutching as reached in FIG. 3, and the pressurization condition of 0 drain pressure, which obtains in the hydraulic system when maintaining full braking as reached in FIG. 4, there lies an infinity of modulated pressures falling in the intermediate range. The steering pressure, right, and the steering pressure, left, in the tractor are independent of one another and, irrespective of what exists on the left side, for example, the steering pressure on the right side controlling the right drive sprocket can be fixed at any point in the intermediate range, or at either extreme of pressurization, or can be undergoing a raising or lowering of pressures either in some sequence with one another or as an isolated instance.

According to our invention, the set value or the changing value of steering pressure is controlled with great precision and exactitude by the means which we provide for that purpose, as will now be explained.

RIGHT SPOOL VALVE 44—FIG. 5

The right-steer valve 44 appearing in this figure: carries, proximately, a drain spool 252 adjacent the spring chamber 218; carries, distally, an end spool 254; and, separated by a valve groove 256 from the end spool 254 and separated from the drain spool 252 by the annular recess 258 formed by a reduced portion of the spool valve, the valve carries a pressure spool 260. To varying degrees depending upon the longitudinal position into which the spool valve 44 slides in the right bore 176, the exterior of the drain spool 252 variously communicates with the spring chamber 218 which is at drain pressure, and so, likewise, does a double helix 262 which is grooved into the spool exterior. Similarly, a double helix 264 which is grooved into the exterior of the pressure spool 260 communicates variously with line pressure from the bore groove 184 which is supplied by the signal pressure port 168 previously described. The double helices 262 and 264 have uniform groove depth, uniform groove size, and uniform helix angle so that the resulting orifice which each helix forms with the closing surface of the valve bore 176 has constant rate of pressure drop along its length after the standard manner of accurate hydropotentiometers.

A signal pickup port 266 formed in the valve in the base of the annular recess 258 communicates through a radial passage drilled in the valve and an interconnecting longitudinal passage 268 with an intervalve chamber 270 defined in the bore 176 between the metering spool 200 and the end spool 254 of the right-steer spool valve 44. In its communicating function in the solid line position of the valve 44 as shown in FIG. 5, the signal pickup port 266 will cause the intervalve chamber 270 to be pressurized at line pressure being introduced by the pressure port 168 through the valve passage 182 and the bore groove 184. The orifice defined by the double helix 262 on the drain spool 252 will be subjected to the full pressure drop from line pressure in the annular recess 258 to the drain pressure in the spring chamber 218.

A light pull exerted on the spool valve 44, shifting it in a direction slightly to the right as viewed in FIG. 5, will cause the annular recess 258 to be isolated from the full line pressure of the bore groove 184, and a portion of the orifice defined by the double helix 264 will become active in supplying the signal pickup port 266 with pressure of slightly reduced value. At the same time, a portion of the orifice defined by the double helix 262 will become inactive where the double helix enters into the drain chamber 218, rendering the pickup the port definitely at an intermediate point in the effective overall orifice length. Further pressure-reducing shift of the spool valve 44 to the right will cause the signal pickup port 266 to slide to a position more nearly approaching the drain pressure and therefore supplying the intervalve chamber 270 with a like reduced pressure.

Finally, shift of the spool valve 44 to its extreme of rightward travel will place the signal pickup port 266 in communication directly with drain pressure, thereby establishing drain pressure in the intervalve chamber 270. In this manner, the pressure of intervalve chamber 270 can be accurately fixed or accurately varied among line pressure and drain pressure, and an infinity of accurately-held pressures in an intermediate range between maximum and minimum.

RIGHT METERING SPOOL—FIG. 6

The metering spool 200 as illustrated in this figure has a center section of reduced diameter which defines a bore passage 272 and which integrally interconnects a solid land 274 and a hollow land 276 of the spool 200. An actual-pressure pickup port 278 in the reduced center section communicates externally through the bore passage 272 and the bore groove 204 with the right inlet-outlet port 202, and communicates internally through a radial passage and a longitudinal passage 280 in the hollow land 276 with a spring chamber 282 which is at an opposite end of the spool 200 from the intervalve chamber 270, previously described.

Adjacent the reduced diameter center section of the spool 200, the solid land 274 has a series of control orifices formed by metering slots 284 in the shoulder thereof; in an extreme position of the metering spool 200, in the rightward direction as viewed in FIG. 6, the slots 284 will communicate with the valve groove 186 which is at drain pressure, and the actual-pressure pickup port 278 and bore passage 272 will therefore communicate drain pressure to the spring chamber 282 and to the inlet-outlet port 202. The opposite extreme position will now be described.

Adjacent its juncture with the reduced diameter center section of the spool 200, the hollow land 276 has a series of control orifices formed by metering slots 286 in the shoulder thereof. In the solid line position of the spool 200 as shown in FIG. 6, the metering slots 286 are out of communication with line pressure, but these slots progressively provide communication with line pressure as the spool 200 shifts leftwardly as viewed in FIG. 6. Thus a metered amount of line pressure up to full line pressure can be communicated from the pressure port 164 through the valve passage 178 and bore groove 180, through the metering slots 286 for ultimate communication with the inlet outlet port 202 and the spring chamber 282 at one end of the spool 200. A weak spring 288 which is in the hollow interior of the land 276 and which seats on an end plate 290 of the steering valve assembly 40, lightly biases the spool 200 in the direction of the opposing much stronger valve return spring 146; the light spring 288 serves, among other things, to prevent the metering spool 200 from drifting when it is depressurized at 282 and out of physical contact with the end spool 254 of the right-spool valve 44.

SIGNALING-METERING—FIG. 6

The first bore 176 and the spool elements therein have the conduit 178 connecting high pressure thereto from the pressure port 164 and passage 178 into the bore groove 180, have the conduit 182 connecting high pressure thereto from the signal-pressure port 168 and passage 182 into the bore groove 184, have the conduit 194 and 196 connecting the low pressure of drain thereto leading to the drain line 198 and leading from the drain port 188 and the bore groove 186, have conduit 208 and 206 connecting the inlet-outlet pressure thereto from the right clutch line 210C and the right brake line 216B, bore groove 214, a bore passage 292 into the inlet outlet port 202 and bore groove 204, and have conduit 224 formed by side grooves in the spring chambers 218 and 222 connecting drain pressure thereto from the drain conduit 226 to the drain spool 252 of the right-steer spool valve 44.

By controllably connecting two of the high pressure and low pressure conduits just described, the pressure and drain spools 260 and 252 of spool valve 44 precisely set the signal pressure at a desired value in the intervalve chamber 270, and the metering spool 200 at its end adjacent the intervalve chamber 270 is exposed to that pressure because of the latter's communication thereto through the signal pickup port 266 and longitudinal passage 268. As already indicated, the signal pressure established by the valve 44 varies between the high and low pressure conduit from a maximum to a minimum proportionally in accordance with the effective length of orifice defined by the double helices 264 and 262 on the spools 260 and 252.

The control orifices formed in the metering spool 200 by the sets of metering slots 286 and 284 vary in size and effective fluid handling capacity depending upon how much each set of orifices projects at the end beyond the adjacent end of the bore passage 272. Thus, each particular longitudinal position of the spool 200 establishes the relative rate of inflow of pressure fluid and outflow of drain fluid through the ends of the bore passage 272, accordingly establishing the pressure of inlet-outlet port 202 between the high and low pressure conduits from a maximum to a minimum.

The metering spool 200 stabilizes in its position at the point when inflow through slots 286 into passage 272 and the outflow therefrom through slots 284 equalize. At that point, the pressure in the spring chamber 282 which is at one end of the spool 200 and which equals inlet-outlet pressure, is also essentially equal to the signal pressure in the intervalve chamber 270. Or more generally, actual inlet-outlet pressure in chamber 282 equals desired pressure set in the chamber 270, if the minor bias of the light spring 288 be ignored, which it can be for our principal considerations.

It is primarily, of course, the strategic location and arrangement of pickup ports 278 and 266 and longitudinal spool passages 280 and 268 in the valve elements which makes it possible to have these elements compactly arranged so as to fit end-to-end in the bore 176 slidably receiving same in common. These elements are totally unlike in function as they mutually relatively move in their bore, and they have a strict master-slave relationship. The valve 44 is the element serving as exact-static-pressure-dictator and position-dictator, and the spool 200 serves as automatic followup element to take a correspondingly satisfied, dictated position in the bore.

FULL CLUTCHING ON RIGHT—FIG. 5

Similarly occupying the full clutching position as shown for the left spool valve 44-2, the right spool valve 44 is shown in this figure in a position supplying line pressure to the right clutch cylinder 96C and, likewise, to the right brake cylinder 90B. In other words, full pressure from the line 56 leads in a path through the valve 174 the line 162, pressure port 164, passage 178, bore groove 180, control orifices 286, bore passage 272, bore groove and inlet outlet port 204 and 202, passage 206, bore groove 208, and thence in split branches one way through clutch line 210C and 72 into clutch cylinder 96C, and the other way through bore passage 292, bore groove 214, and brake line 216B into the right brake cylinder 90B. At the same time, the solid land 274 of metering spool 200 blocks the right end of the valve passage 272 preventing fluid in the inlet-outlet port 202 escaping from the orifices 284 and bore groove 186 to drain 198.

In the desired way, therefore, the right clutch cylinder 96C will force the right clutch disk, not shown, into full engagement and the right brake cylinder 90B will force the right brake piston, not shown, into fully disengaged position.

FULL BRAKING, RIGHT VALVE 44—FIG. 6

The right-steer spool valve 44 affords not only a controlled way of braking fully on the right side, but also an assured way of braking.

For causing its controlled way of fully braking, the spool valve 44 from its valve-in position is pulled by the lever connection 144 to its full valve-out position as shown in solid lines in FIG. 6. The metering spool 200 follows the valve 44 part way under bias of the light spring 288 in the spring chamber 282, thus occupying its full rightward position is shown in solid lines in FIG. 6. Because the signal pickup port 266 of the valve 44 is connected by the groove 224 with the drain line 226, the pickup port 266 is at drain pressure and communicates the drain pressure through the valve longitudinal passage 268 to the intervalve chamber 270. The metering slots 286 of spool 200 are covered, blocking off the inlet outlet port 202 from line pressure, whereas the control orifices formed by the metering slots 284 and the bore passage 272 establish the inlet-outlet port 202 at the drain pressure of bore groove 186. Hence, the actual-pressure pickup port 278 communicates drain pressure through the longitudinal valve passage 280 and hollow interior of the hollow land 276 to the spring chamber 282.

Pressures at opposite ends of the spool 200 are thus equalized. Hence, the right brake and right clutch cylinders, not shown, empty in that sequence through the respective brake conduit 216B and clutch conduit 210C, so that the right brake, not shown, is fully spring engaged and the right clutch pressure plate, not shown, is fully disengaged.

For causing its assured way of fully braking, the spool valve 44 in its valve-out position as shown in FIG. 6 has the end land 254 thereof so arranged as to uncover a reduced diameter portion of a bore groove 294 with which a valve body port 296 communicates.

In actual practice, the valve body port 296 and the right-steer inlet-outlet port 202 are directly connected so as to intercommunicate the bore grooves 204 and 294. As presently illustrated, however, a schematically shown passage 298 intercommunicates both the grooves 204 and 294 and also the schematically shown passage 206 leading to the right clutch line 210C.

At all events, the right clutch line 210C is thus emptied in a path leading from the bore groove 294, the intervalve chamber 270, the longitudinal valve passage 268, and signal pressure pickup port, thence through the grooves 224 into the drain line 226. The right brake line 216B communicates in much the same way except at the outset where the path leads through the bore groove 214 and valve passage 292, so that the brake cylinder and clutch cylinder on the right side are fully drained or at least assured of full drainage owing to the position of the end land 254 of the spool valve 44.

So even if the spool 200 for the right-steer side fails to shift into the correct position as illustrated in FIG. 6, the steering mechanism is assured of full declutching and full braking on the tractor at that side.

DRAG: ON BRAKE CAUSED BY VALVE 44—FIG. 7

In the illustrated position of the right-steer spool valve 44 in this figure, in which the corresponding system pressure will be 40 or 60 psi (3 atmospheres or 4 atmospheres), for example, the valve 44 will cause partial braking on the right side, such as for a steering turn. Hence, the signal pickup port 266 in its relation to the respective double helices 264 and 262 will communicate the desired signal pressure into the intervalve chamber 270.

The metering spool 200 is shown making its final slight adjustment in the direction of the arrow 300 into fully balanced or satisfied position. And, when finally adjusted into the satisfied position, the metering slots 286 forming the control orifices of the spool 200 will be barely uncovered to allow fluid flow at a slow rate under high pressure drop, whereas the metering slots 284 will be slightly more uncovered and allowed the same rate of flow under a smaller pressure drop leading into drain. The chambers 282 and 270 under the actual and desired pressures at opposite ends of the spool 200 will be essentially equalized in pressure.

SLIP CLUTCH DRIVE ON RIGHT—FIG. 8

The spool valve 44 is shown adjusted in, and the metering spool 200 is shown stabilized in, the position for partial, right-side clutching corresponding to an hydraulic pressure of 120 or 150 psi (8 or 10 atmospheres), for example, in the system. In such valve position, the pickup port 266 of right-steer valve 44 will be communicating the desired pressure to the end of the metering spool 200 adjacent the intervalve chamber 270. Essentially equal and opposite pressure will be communicated by the pickup port 278 into the spring chamber 282 at the end of the spool 200 adjacent the valve plate 290. A minor, steady flow of fluid from the pressure port 164 to the drain port 188 will be maintained by the metering spool 200 after it stabilizes so that the orifices through slots 286 provide a relatively small pressure drop as the volume of flow makes entry into bore work passage 272, whereas the control orifices through slots 284 cause a relatively large pressure drop in the same volume of flow in passing from the passage 272 to drain.

The resulting slipping clutch drive at the right side of the tractor will, if complemented by a full clutching drive on the left side, not shown, produce a sweeping or gradual steering turn to the right.

OPERATION: OTHER CLUTCH-BRAKE VALVE—FIG. 5

The left or second clutch-brake spool valve 44-2 and metering spool 200-2 are illustrated in this figure in the full clutching position. The accessibility of the second bore 176-2 is essentially the same for pressure from the pressure ports 164 and 168, for drain from the conduit 190, 186 and drain port 188, for drain from the spring chamber 220, side groove 224 and drain line 226, and for inlet-outlet pressure to be set in the left clutch and left brake from a second inlet-outlet port 302 and conduit generally designated 304 leading into the conduit 210C-2 and 216B-2 leading to the respective left clutch and left brake cylinders.

For the sake of brevity, a disclosure is omitted of the various positions of the valve elements in the second bore 176-2 for causing no clutching or braking, partial clutching, partial braking, and full clutching and full braking on the left side of the tractor.

FOOT BRAKE SPOOL VALVE 48—FIG. 6

In reference to the brake bore 192 shown receiving it in this figure, the foot brake spool valve 48 is shown all the way in, producing no braking. Consistent with its purpose in that valve position, and for controlling the right side of the tractor, the foot brake valve 48 has a pair of control spools 306 and 308 which open opposite ends of the valve passage 292, thus enabling pressure from the inlet-outlet the port 202 to be freely communicated through the bore grooves 208 and 214, respectively, to the right clutch line 210C and the right brake line 216B for establishing inlet-outlet pressure therein. At their respective shoulders adjacent the reduced diameter portion of the brake spool valve 48, the spool 306 has two control slots 310 and the spool 308 has two control slots 312. The valve 48 is drilled as generally indicated at 314 and is vented therethrough for free movement with respect to the valve plate 290.

Control spools 316 and 318 on the valve 48 coact similarly with a valve passage 320 which is between a bore groove 322 and a bore groove 324 so as to communicate inlet-outlet pressure for the left side of the tractor through the second lines 210C-2 and 210B-2 to the left side clutch and brake. Hence, both steering brakes are held released, and the brake valve 48 introduces braking on neither side of the tractor. However, by modulating the inlet-outlet port pressures, which the brake valve 48 can do by progressively dumping them to drain, the brake valve can cause the brakes to be set for various degrees of drag or be fully set, as will now be explained.

DRAG: ON BRAKE CAUSED BY VALVE 48—FIG. 7

When, by means of the pedal connection 138, the brake spool valve 48 is pulled to a partial valve-out position as illustrated in this figure, the inlet-outlet pressure at its existing value in port 202 is communicated to the right clutch line 210C, and yet the clutch line 210C becomes isolated from the brake except through the two control slots 310 in the valve control spool 306. Meantime, the brake line 216B for the right brake is opened to a considerable extent to the drain line 198 through the two control slots 312 in the control spool 308 of valve 48. Hence, the right steering brake is partially applied and, for the most part, the right clutch releases.

The control spools 316 and 318 for the tractors left side are similarly operating the brake and clutch lines on the left side, namely, 210B-2 and 210C-2 and, at the same time, causing the brakes on the left side to drag with partial braking. The brake as now set on the two sides of the tractor will consequently have the same pressure of partial brake engagement even though, as illustrated in FIG. 7, the steering valves are set differently. Hence, the left track will be clutch driven for the position shown for the left valve 44-2, whereas the right track will have little or no clutch drive thereupon when the right valve 44 is in the position illustrated in FIG. 7. The tractor accordingly will slowly make a right turn, slowly in the respect that both tracks are being partially braked by action of the foot brake. It is evident the graduality or sharpness of the resulting turn will depend in part on the terrain, e.g., clay surface, gravel surface, and so forth.

Equalization between the hydraulic power brakes is insured because of the connection from the right brake line 216B leading in a path including the bore groove 214, general drilling in the valve 48 at 314, a bore groove 326, a passage 328, a bore groove 330, thence through the left brake line 216B-2 into the left brake cylinder, not shown.

FULL BRAKING, FOOT BRAKE VALVE 48—FIG. 8

When the brake spool valve 48 is pulled by means of the brake connection 138 the and foot brake and into the full brake position as illustrated in this figure, the spool 306 of the valve 48 isolates the clutch line 210C and bore groove 208 from the drain line by closing the two control slots 310 completely at one end. The right brake line 216B and bore groove 214 on the other hand are in full communication via the bore passage 292, control slots 312, and bore groove 194 with the drain line 198. Full braking in the right steering brake therefore transpires. Similarly, the pair of left control spools 316 and 318 isolate the second clutch line 210C-2 and communicate the second brake line 216B-2 freely with the drain 226.

Hence, equalized full brake pressure is applied to both sides and the tractor is braked to a stop. In one physically constructed embodiment of the invention, the spool valves 48, 44, and 44-2 had a full travel of 0.5 inch in order to take the full valve-out position illustrated for brake spool valve 48 in FIG. 8. Each such valve carries a shoulder such as the shoulder 332 illustrated on valve 48, engageable with a spring seat 334 for the corresponding return spring, namely, the brake spring 140 in FIG. 8. When the connection 138 is released from pull by the operator, the return spring 140 will immediately re-expand to restore the valve concerned, valve 48, to its in-position or normal position. A spacer sleeve 336 between the seat 334 and a stuffing gland 338 acts as a valve stop to limit the out-travel as each valve is pulled to valve-out position.

In operation of the steering levers 42 and 42-2 from the full clutch position as shown in FIG. 1, the lever at one side of the vehicle can be gradually rearwardly tilted by the operator so as to cause the track at that side to become, respectively, only partially clutched, only partially braked, or fully braked causing a sweeping, gradual, or abrupt turn of the vehicle to that side.

Or viewed the other way, in tilting the steering lever at either side gradually forwardly, the operator causes the steering pressure at that side to go from zero to 100 psi (7 atmospheres) in the example illustrated, changing the steering brake disks from full contact pressure to release, or zero contact pressure. The steering clutch at the time is disengaged and remains disengaged to 100 psi (7 atmospheres).

Then from 100 psi to 270 psi (7 atmospheres to 18 atmospheres) internal hydraulic pressure, the pressure forcing the clutch plates together at that side increases from zero contact pressure to full clutching pressure.

While the tractor can be braked to a full straight stop by pulling the steering levers 42 and 42-2 to the rear simultaneously, the simple way intended for producing a straight full stop is by full depression of the foot brake 46. In one physically constructed embodiment of the invention the brakes, under their full-stop setting, could be overcome with engine torque only with the gearing in the highest ratio setting (low gear) and with full power clutching.

As herein disclosed the clutch springs 98, which can be characterized as light springs, are described as allowing the clutch piston at 50 psi (3 atmospheres) to start moving and then at 100 psi (7 atmospheres) to encounter the solidness of the pressed-together clutch disks which the piston contacts. It is evident that, if desired, the clutch springs can be made somewhat weaker, thus allowing the clutch plates to be in contact with the clutch piston before the brake can have reached 100 psi (7 atmospheres) and have fully released. Or if the brake springs 92, which can be characterized as heavy, are made somewhat stronger, the same effect can be made to occur whereby the clutch piston will have come into contact with and started compressing the clutch plates before the brake is fully released. In these ways, the overlap whereby both the clutch and the brake are slightly engaged at the same time on one or both sides of the tractor can be varied to suit individual circumstances and needs.

Variations within the spirit and scope of the invention described are equally comprehended by the foregoing description.

What is claimed is:

1. Steering-by-driving system for a common output member which is rotatable including:
    clutch-brake mechanism for controlling rotation of the common output member, said clutch-brake mechanism including actuatable clutch and brake cylinders which, when actuated at the same pressure, act primarily in alteration to one another to engage the brake and release the clutch under low pressure on both, and to release the brake and engage the clutch under high pressure on both;
    steering valve mechanism having an inlet in the inlet one of its inlet and outlet sides and having a metering valve on the inlet side;
    clutch and brake conduit connected at one end to the outlet side of the steering valve mechanism and connected at the other end to the respective clutch and brake cylinders, said metering valve effective to supply fluid at the same pressure through the clutch and brake conduit to the clutch and brake cylinders;

a tow valve reposing in the clutch conduit for blocking same, and having a pressure chamber with pressure movable means therein to cause operation of the tow valve to a valve-open condition; and pressure-fitting means connected to the inlet of the steering valve mechanism for communicating, in an emergency, pressure fluid controlled by the metering valve which is transmitted therefrom through the brake conduit to the brake cylinder and blocked in the clutch conduit by the reposing tow valve therein, whereby the brake cylinder is actuated under pressure to release the brake on the common output member whilst the clutch cylinder is being blocked from pressure and effectively keeping the clutch released.

2. The invention of claim 1, further including:

line-pressure means having a 1st connection to the inlet of the steering valve mechanism for communicating line pressure controlled by the metering valve which is transmitted thereby into the clutch and brake conduit, and having a 2d connection to the tow valve pressure chamber so that the resulting valve-open condition causes metered line pressure in the clutch conduit to be communicated to the clutch cylinder whilst the same metered line pressure is being communicated in the brake conduit to the brake cylinder.

3. The invention of claim 2, characterized by:

said pressure-fitting means including a one-way valve for, on the one hand, preventing escape of line pressure from the inlet of the steering valve mechanism;

the 1st connection of said line-pressure means including a one-way valve for, on the other hand, preventing escape of emergency pressure fluid being communicated through the pressure-fitting means to the inlet of the steering valve mechanism.

4. The invention of claim 2, characterized by:

said steering valve mechanism further having on its outlet side a drain for a brake valve, and a brake valve therein connected in the clutch and brake conduit effective to cause progressive dumping, from the clutch and brake conduit to said drain, of actuating pressure present, if any, for the clutch and brake cylinders.

5. Steering-by-driving system for a vehicle having 1st and 2d sides each with a common ouput member which is rotatably mounted at that side, said system including:

1st and 2d clutch-brake mechanisms at the respective 1st and 2d vehicle sides each for controlling rotation of the common output member at that side, each clutch-brake mechanism including actuatable clutch and brake cylinders which, when actuated at the same pressure, act primarily in alternation to one another to apply the brake and release the clutch under low pressure on both, and to release the brake and apply the clutch under high pressure on both;

steering valve mechanism having 1st and 2d satisfied-metering spools therein, each spool having pressure movable areas on the spool ends for positioning same to vary an actuating output pressure produced thereby between high and low pressures from a maximum to a minimum in accordance with spool position; and 1st clutch and brake conduit connected, at one end, in the output of the 1st satisfied-metering spool and connected at the other end to the respective clutch and brake cylinders of the 1st clutch-brake mechanism, and 2d clutch and brake conduit connected, at one end, in the output of the 2d satisfied-metering spool and connected at the other end to the respective clutch and brake cylinders of the 2d clutch-brake mechanism, each satisfied-metering spool attaining a satisfied condition when the force on one end provided with a pressure movable end area is balanced by the force on the opposite end provided with a pressure movable end area, and each effective whereby its actuating output pressures communicated through the clutch and brake conduit are supplied to the clutch and brake cylinders concerned at the same pressure.

6. The invention of claim 5, characterized by:

said steering valve mechanism further having a drain for a vent-causing brake spool, and a brake spool therein interposed in the 1st and 2d clutch and brake conduit for venting actuating output pressures to said drain so that the brakes apply in the 1st and 2d clutch-brake mechanisms and the clutches release.

7. The invention of claim 5, characterized by:

a tow valve interposed in the 1st and 2d clutch conduit having a line pressure chamber which, when pressurized, causes the valve to open in a shifted position as caused by line pressure, said tow valve taking an unshifted position blocking the 1st and 2d conduit in response to failure of line pressure.

* * * * *